(12) United States Patent
Browne

(10) Patent No.: US 6,320,581 B1
(45) Date of Patent: Nov. 20, 2001

(54) SIMULATED ILLUMINATION OF PLANAR SHAPES

(75) Inventor: Cameron Bolitho Browne, Burleigh Heads (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/277,168

(22) Filed: Mar. 26, 1999

(30) Foreign Application Priority Data

Mar. 27, 1998 (AU) .................................................. PP2652

(51) Int. Cl.[7] .................................................. G06T 15/60
(52) U.S. Cl. .......................... 345/426; 345/423; 345/442; 345/581; 345/589
(58) Field of Search .................................. 345/426, 423, 345/420, 427, 429, 431, 432, 442, 468, 606, 589

(56) References Cited

U.S. PATENT DOCUMENTS 5,363,477 * 11/1994 Kuragano et al. .................... 345/426
5,854,632 * 12/1998 Steiner ................................. 345/426

* cited by examiner

*Primary Examiner*—Mark Zimmerman
*Assistant Examiner*—Kimbinh T. Nguyen
(74) *Attorney, Agent, or Firm*—Fitzpatrick, Cella, Harper & Scinto (57) ABSTRACT

A method for simulating three-dimensional illumination of a planar shape element (1) defined by a closed curve. The method includes the steps of providing a planar shape element (1) having a colour Co, defining a colour Cw between Co and white and defining a colour Cb between Co and black. Opacities Oh and Ol are then defined. A diffuse highlight element (4) is generated based on a first curve portion (10) of the closed curve, the colour and opacity of the diffuse highlight element (4) graduating from Cw,Oh at a first edge portion (8) thereof to Co,0 at a generally offset second edge portion (12) thereof. Similarly, a diffuse shadow element (6) is generated based on a second curve portion (16) of the closed curve generally opposite the first curve portion (10) thereof. The colour and opacity of the diffuse shadow element (6) graduates from Cb,Ol at a first edge portion (14) thereof to Co,0 at a generally opposite second edge portion (18) thereof. The planar shape element (1) is then rendered, such that the diffuse elements are layered on top of the planar shape element, thereby to simulate three-dimensional illumination thereof. Preferably, the method includes the steps of generating a specular element (28) and, during the rendering step, rendering the specular element (28) such that it substantially overlaps the diffuse highlight element (4). Also disclosed is an apparatus for implementing the method of invention.

24 Claims, 7 Drawing Sheets

SIMULATED ILLUMINATION OF PLANAR SHAPES

FIELD OF THE INVENTION

The present invention relates to simulated illumination of planar, two-dimensional shapes, and in particular to generating an illusion of solidity associated with such shapes.

The invention has been developed primarily to provide individual tiles within a tessellated pattern with a simulated three-dimensional appearance, and shall be described hereinafter with reference to this application. However, it will be appreciated that the invention is not limited to this field of use.

BACKGROUND OF THE INVENTION

There exists a number of standard illumination models for rendering three-dimensional graphical models with photo-realistic results. Such models typically are composed of three-dimensional surfaces defined by geometrical primitives such as surface patches or meshes of polygonal facets. These models may also take into account a number of illuminating light sources.

The main illumination model used in three-dimensional computer graphics is based on the physical characteristics of incident rays of light illuminating a given scene or object. The model generates a variety of illumination components based upon the varying reflective properties of the surfaces being illuminated. These components include:

1. Ambient light, which illuminates all surfaces equally. The intensity of light reflected by a given primitive is dependent only upon the intensity of ambient light and the reflective coefficient of the surface. This results in relatively constant shading across the primitive.

2. Diffuse reflection, in which reflection across the surface varies according to the relationship between the angle to the light source and the surface normal at each point. Intensity increases as the two angles approach each other, and correspondingly decreases as the angles diverge, according to Lambert's Cosine Law. This results in smooth shading across the primitive that includes highlight and shadow regions. Gouraud shading produces this result.

3. Specular reflection, which is one or more sharply focussed highlight regions, typically exhibited by a "glossy" surface. Specular reflection is calculated from the relationship between the angle to the light source, the angle to the view point, and the surface normal. Phong shading produces this result.

The illumination of any point within a three-dimensional scene, relative to a view point, may be determined by adding the red, green and blue reflective contributions for each of the above reflective components, for each light source.

Unfortunately, to provide an accurate representation of a three-dimensional object, it is necessary to calculate intensity for the various colours and components on a per-pixel basis. This, and the accompanying three-dimensional geometry calculations, can place a relatively high load on a computer processor. This in turn limits the speed with which the appearance of a scene may be calculated. For the purposes of interaction, such as for games or multimedia applications, such speed restrictions are undesirable at best.

Accordingly, it is an object of the present invention to provide a method of applying various highlight and/or shadow components to a planar shape to suggest a three-dimensional interpretation thereof without requiring the complex, per-pixel intensity calculations of true three-dimension illumination modelling.

SUMMARY OF INVENTION

Accordingly, in a first aspect, the invention provides a method for simulating three-dimensional illumination of a planar shape element defined by a closed curve, the method including the steps of:

(a) providing a planar shape element having a colour Co;

(b) defining a colour Cw between Co and white;

(c) defining a maximum opacity Oh;

(d) generating a diffuse highlight element based on a first curve portion of the closed curve, the colour and opacity of the diffuse highlight element graduating from Cw,Oh at a first edge portion thereof to Co, 0 at a generally opposite second edge portion thereof;

(e) rendering the planar shape element and the diffuse highlight element for printing or display, such that the diffuse highlight element is layered on top of the planar shape element, thereby to simulate three-dimensional illumination thereof;

wherein steps (a) to (e) may be performed in any suitable order.

In a second aspect, the invention provides a method for simulating three-dimensional illumination of a planar shape element defined by a closed curve, the method including the steps of:

(a) providing a planar shape element having a colour Co;

(b) defining a colour Cb between Co and black;

(c) defining a maximum opacity Ol;

(d) generating a diffuse shadow element based on a first curve portion of the closed curve, the colour and opacity of the diffuse shadow element graduating from Cb,Ol at a first edge portion thereof to Co,0 at a generally opposite second edge portion thereof; and (e) rendering the planar shape element and the diffuse shadow element for printing or display, such that the diffuse element is layered on top of the planar shape element, thereby to simulate three-dimensional illumination thereof;

wherein steps (a) to (e) may be performed in any suitable order.

In a third aspect, there is provided a method for simulating three-dimensional illumination of a planar shape element defined by a closed curve, the method including the steps of:

(a) providing a planar shape element having a colour Co;

(b) defining a colour Cw between Co and white;

(c) defining a colour Cb between Co and black;

(d) defining a maximum opacity Oh;

(e) defining a maximum opacity Ol;

(f) generating a diffuse highlight element based on a first curve portion of the closed curve, the colour and opacity of the diffuse highlight element graduating from Cw,Oh at a first edge portion thereof to Co, 0 at a generally opposite second edge portion thereof;

(g) generating a diffuse shadow element based on a second curve portion of the closed curve generally opposite the first curve thereof, the colour and opacity of the diffuse shadow element graduating from Cb,Ol at a first edge portion thereof to Co,0 at a generally opposite second edge portion thereof; and (h) rendering the planar shape element, the diffuse highlight element and the diffuse shadow element for printing or display, such that the diffuse elements are layered on top of the planar shape element, thereby to simulate three-dimensional illumination thereof;

wherein steps (a) to (h) may be performed in any suitable order.

Preferably, the first edge portions of the diffuse highlight and shadow elements overlie the first and second curve portions of the closed curve upon which they are respectively based. It is also preferred that the respective second edge portions of the diffuse highlight and shadow elements are based on the first and second curve portions of the closed curve respectively. Desirably, the diffuse highlight and shadow elements are generated on the basis of preselected lighting parameters, which may include a light direction and a light elevation.

Preferably, the method further includes the steps of:

defining a plurality of normals extending outwardly from a corresponding plurality of points on the closed curve;

calculating an angle between the light direction and each of the plurality of outwardly extending normals;

using a section of the closed curve for which the calculated cosines are within a predetermined range, and for which the normals are generally opposed to the light direction, as the first curve portion; and using a section of the closed curve for which the calculated cosines are within a predetermined range, and for which the normals are generally aligned with the light direction, as the second curve portion;

wherein the steps may be performed in any suitable order.

In a particularly preferred embodiment, the method further includes the steps of:

generating a specular element; and during the rendering step, rendering the specular element such that it substantially overlaps the diffuse highlight element.

Throughout the specification, there appear a number of terms, which are defined as follows:

Cx—designates a colour. Co is the basic colour of the planar shape element, and represents an ambient illumination component. Cw is a colour between Co and white, and potentially includes pure white. Conversely, Cb is a colour between Co and black, and potentially includes pure black.

Cx,y—designates a colour and associated opacity. The opacity, y, can range from 0, which is transparent, to 1, which is opaque. Opacities Oh and Ol are parameters associated with regions of maximum highlight and shadow respectively, and are discussed in more detail below.

Other aspects and features of the invention will become apparent from the following detailed description of the preferred embodiments.

BRIEF DESCRIPTION OF DRAWINGS

Preferred embodiments of the invention will now be described, by way of example only, with reference to the accompanying drawings, in which.

DETAILED DESCRIPTION OF THE PREFERRED EMBODIMENTS

It will be appreciated that the preferred embodiment of the present invention is not aimed at producing a physically realistic model of three-dimensional illumination of a three-dimensional object. Rather, it is intended to provide visual cues to changes in shade and contrast across a planar shape based on its original colour to suggest a three-dimensional interpretation to the human eye. Depending upon the implementation, a single diffuse element, being either a highlight or a shadow, may be sufficient to imply the requisite three-dimensionality. In other embodiments, diffuse highlight and shadow elements are both used, optionally along with a specular glint element, to maximise the realism of the three-dimensional illusion.

Figures 1, 2:
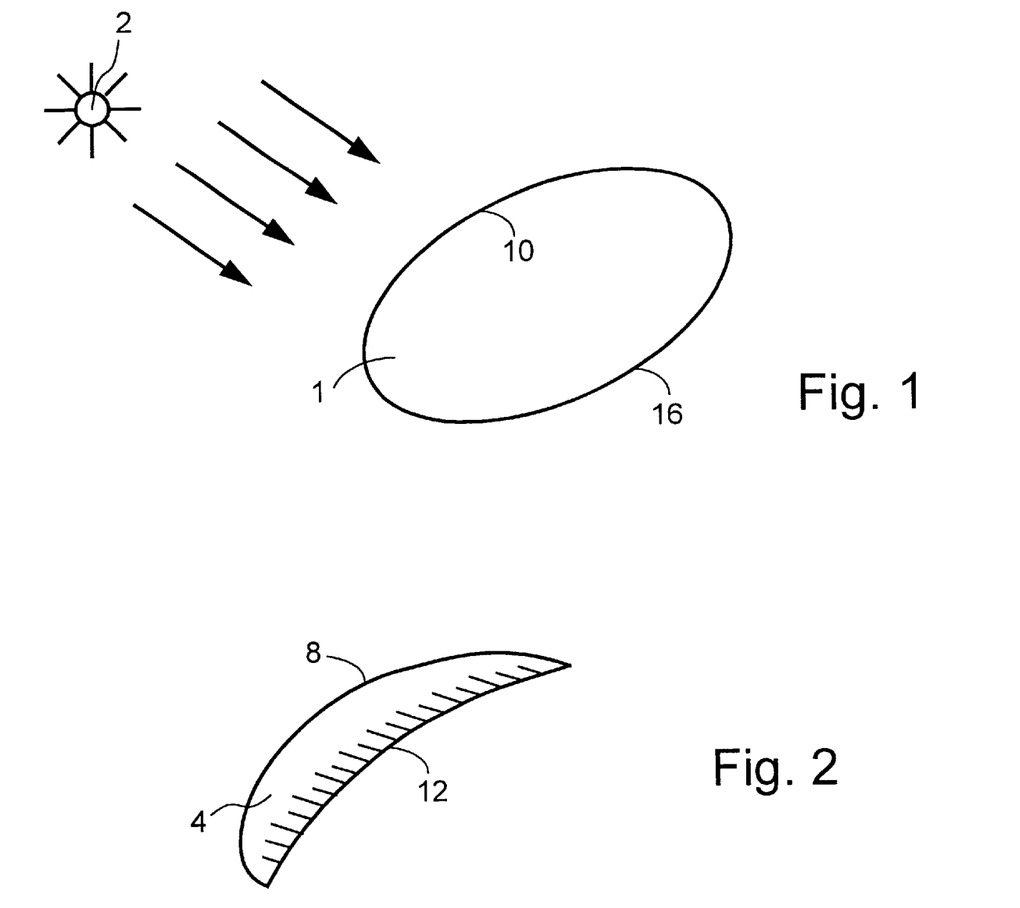
FIG. 1 shows a planar shape element prior to application of the method of the preferred embodiment.
FIG. 2 shows a diffuse highlight element generated in accordance with the preferred embodiment.

As shown in FIG. 1, a planar shape element 1 is illuminated by one or more light sources 2, each of which results in diffuse and specular regions across its surface. For the purposes of the calculations, the light sources 2 are considered to be at an infinite distance from the shape element 1, illuminating it with an infinite number of parallel rays. The shape element 1 itself can be any suitable image, including text or graphics. In the preferred embodiment, the shape is one of a plurality of "tiles" used in a mosaic effect applied to an image. The use of many such tiles, each of which is relatively small in comparison to the overall image, makes the illusion of solidity even more realistic, as the eye is not drawn to examine the shading effects associated with individual tiles too closely.

The preferred embodiments use a number of components to suggest three-dimensionality of a planar shape, the components including:

1. Ambient Component

The ambient component is simply Co, the original colour of the planar shape element 1. The planar shape element 1 is uniformly filled with the colour Co,1, upon which the illumination components are laid.

2. Diffuse Components

Figure 3:
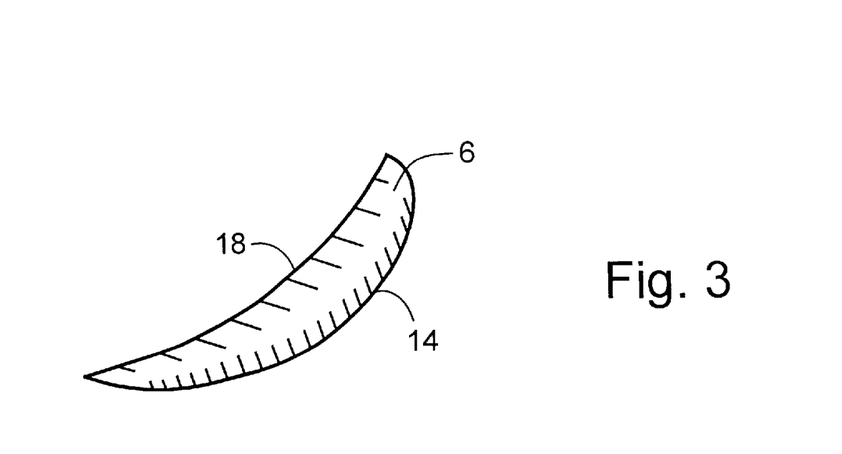
FIG. 3 shows a diffuse shadow component generated in accordance with the preferred embodiment.

As best shown in FIGS. 2 and 3, the diffuse components are elements defining smoothly changing regions of highlight and shadow. They include a diffuse highlight element 4, and a diffuse shadow element 6.

Each diffuse highlight element 4 is defined by a curve pair. An outer highlight curve 8 matches a corresponding segment 10 of the closed curve (see FIG. 1), whilst an internal highlight curve 12 corresponds generally to the outer highlight curve 8 but is offset towards a centre of the planar shape element 1. The amount of internal offset is governed by an elevation parameter E which can either be fixed, or selected by a user. The outer highlight curve 8 is of colour Cw,Oh and the internal highlight curve 12 is of colour Co,0. The parameter Oh is usually selected by a user, although it may have a default value. The colour and opacity within the region between the two highlight curves is smoothly interpolated between Cw,Oh and Co,0 This ensures that the perceived maximum contribution of "light" occurs adjacent the outermost edge of the planar shape element 1, and that the internal highlight curve 12 blends smoothly into the ambient colour Co. It will be appreciated that the interpolation of colour and opacity can be a simple linear interpolation, or can be based on some predetermined function, such as a logarithmic or sinusoid function.

Similarly, each diffuse shadow element 6 is defined by a curve pair, in which an outer shadow curve 14 matches a corresponding segment 16 of the closed curve 1. An internal shadow curve 18 corresponds generally to the outer shadow curve 14, but is offset towards a centre of the planar shape element 1. Again, the amount of internal offset is governed by the elevation parameter E. The outer shadow curve 14 is of colour Cb,Ol, and internal shadow curve 18 is of colour Co,0. The colour and opacity within the region between the two curves is smoothly interpolated, which ensures that the maximum contribution of shadow occurs adjacent the outer shadow curve 14, and that the internal edges smoothly blend into the ambient colour Co. Again, linear or some other interpolation function can be used.

Figure 9A:
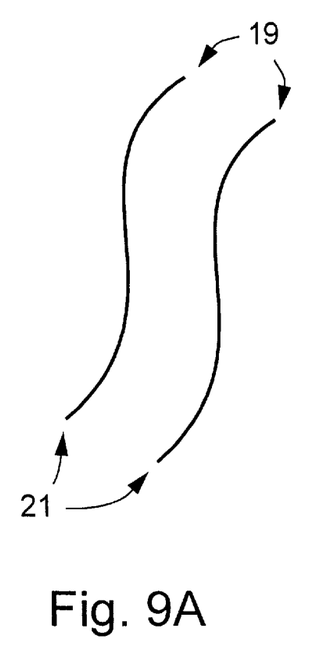
FIGS. 9A and 9B show first and second edge portions of diffuse and highlight elements and the smooth joining of adjacent ends thereof.
Figure 9B:
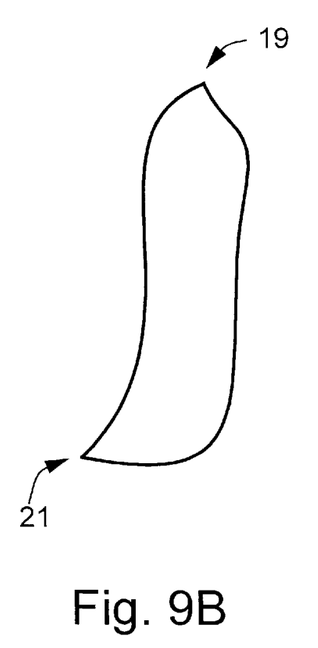

Although the internal curves are based on their respective outer curves, it is desirable to smoothly close the curve ends by snapping each internal curve's end points to its associated outer curve's end points. As shown in FIGS. 9A and 9B, this reduces discontinuities in contrast at ends 19 and 21 of the diffuse highlight and shadow elements.

Figure 6A:
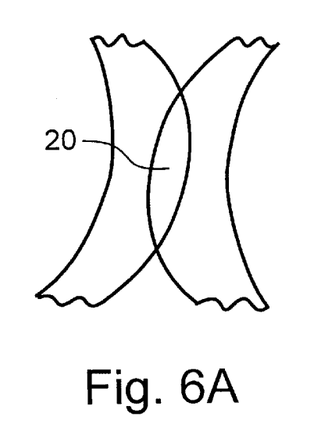
FIGS. 6A and 6B shows overlapping diffuse highlight and shadow areas, and the removal of overlapping parts thereof.
Figure 6B:
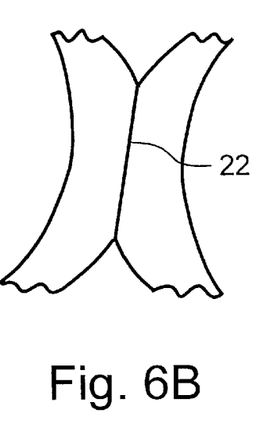
Figure 7A:
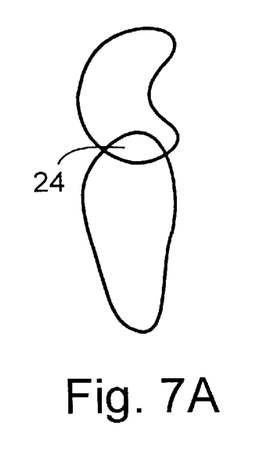
FIGS. 7A and 7B shows overlapping diffuse elements of the same type, with the overlap being removed.
Figure 7B:
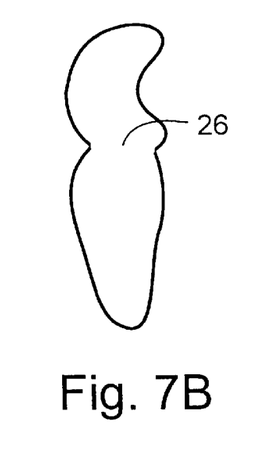
Figure 8:
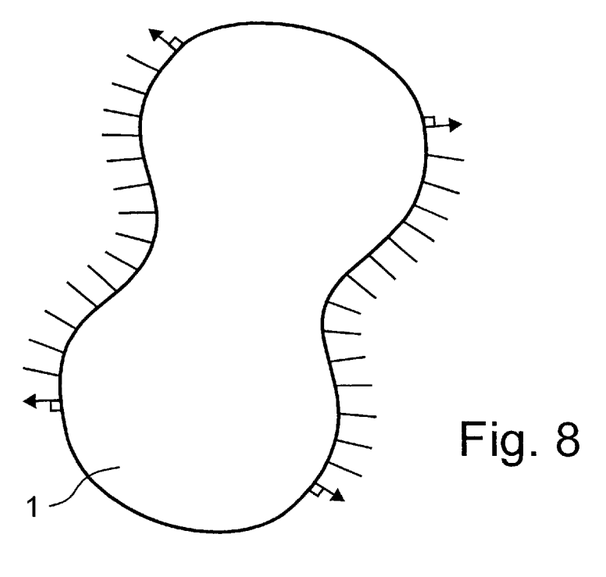
FIG. 8 shows a series of outwardly extending normals around a shape element.

The overlapping of diffuse highlight or shadow elements with other diffuse highlight or shadow elements of opposite polarity, as shown in FIGS. 6A and 6B should be avoided. The composition of illumination components is additive, and hence overlap regions would not cancel out. This is solved by identifying regions 20 at which diffuse highlight elements and diffuse shadow elements overlap, and snapping the curves together for those regions to produce a single transition line 22 (see FIG. 6B). Alternatively, opposite polarity overlap may be avoided if internal region offsets are made relative to the outline's local distance to the shape's Medial Access Transform ("MAT"), as will be understood by those skilled in the art Similarly, overlapping diffuse highlight or shadow elements with other diffuse or highlight elements of the same polarity should be avoided. Again, the composition of illumination components is additive, and overlap regions 24, as shown in FIG. 7A, will tend to accumulate incorrectly. This problem may be overcome by identifying same-polarity regions 24 that overlap and reducing them to a single region 26, as shown in FIG. 7B. In general, this case should not arise unless multiple light sources are used.

3. Specular Component

Figure 4:
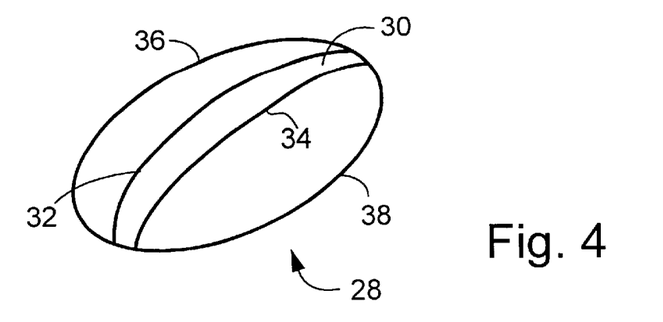
FIG. 4 shows a specular element generated in accordance with the preferred embodiment.
Figure 5:
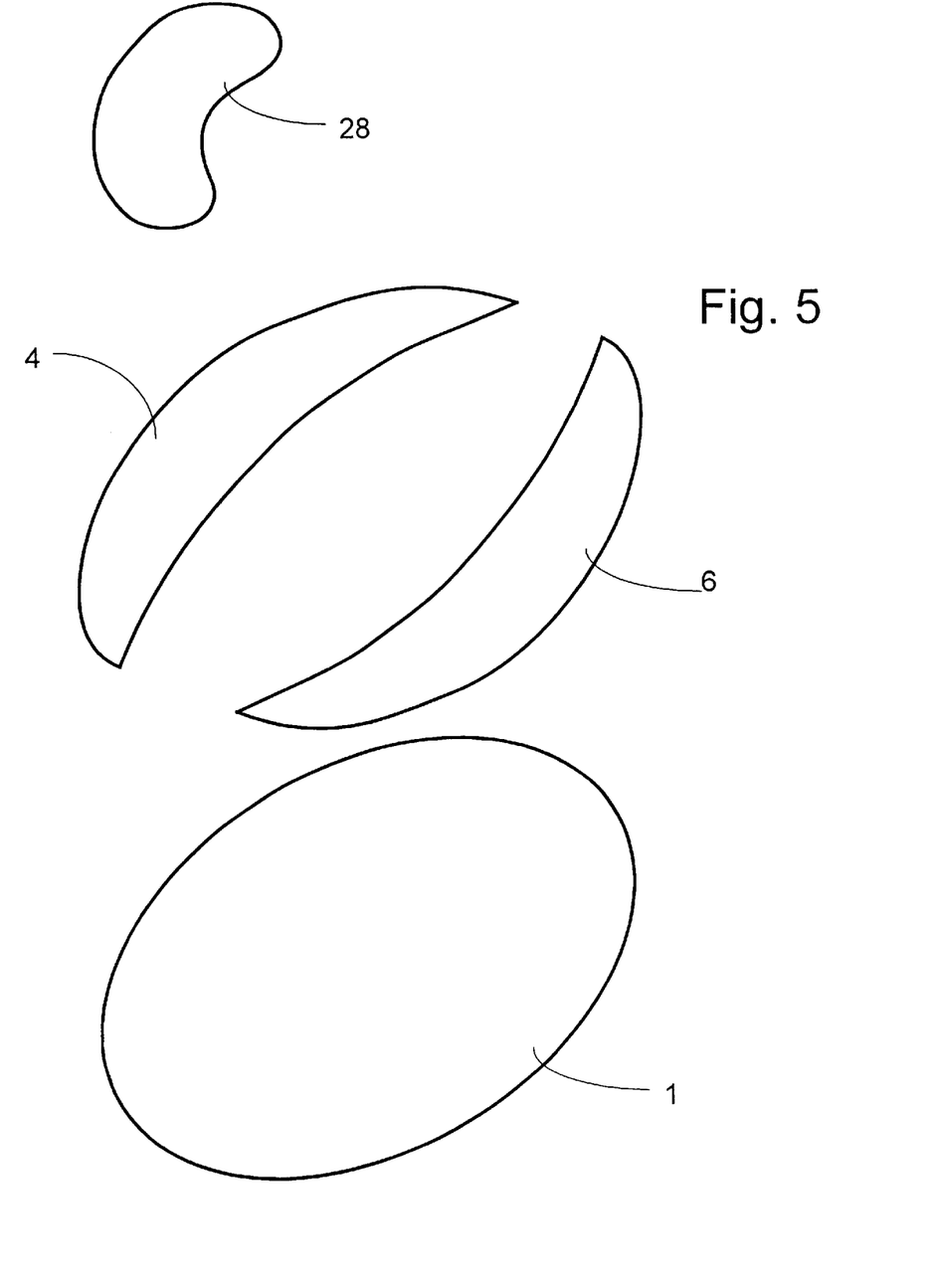
FIG. 5 is an exploded view showing laying of the diffuse highlight and shadow areas, and the specular highlight, on the basic highlight shape elements.

In a preferred form of the invention, a specular element 28, as shown in FIG. 4, is generated and added to the diffuse highlight regions to simulate a "glint" produced by specular reflection. The specular component 28 appears as a sharply focused and intense lightening in colour at regions of high reflective intensity, similar to Phong shading.

The specular element contains a central region 30 of maximum intensity Cw,s, where s is a user defined parameter specifying the desired intensity of the specular element. Cw,s is applied uniformly across the central region.

The central region is defined by two central sides 32 and 34, each of which has associated with it a paired offset side 36 and 38 respectively. The region between each central side and its paired offset varies smoothly in colour from the maximum intensity Cw,s to Cw,0, thereby ensuring that the specular element 28 blends smoothly with underlying components.

The central region 30 of the specular element 28 can be determined geometrically, or may simply be defined as a subsegment of an internal curve of the diffuse highlight element 4. Usually, there will be one specular element per diffuse highlight component, although this is not a firm rule.

The diffuse elements 4 and 6 are composited over the ambient element 1. Predetermined values Oh and Ol indicate the strength of the highlight and shadow diffuse components respectively by specifying opacities at the outer curves 8 and 14. These values govern the amount by which the diffuse elements obscure the underlying ambient component, and affects the lightness and darkness of the diffuse regions respectively.

In an alternative embodiment, by altering Cb to be a colour other than a colour between Co and black, the method may be used to simulate illumination by coloured lighting. Similar corresponding effects are achievable by altering Cw to be a colour other than a colour between Co and white.

Figure 10:
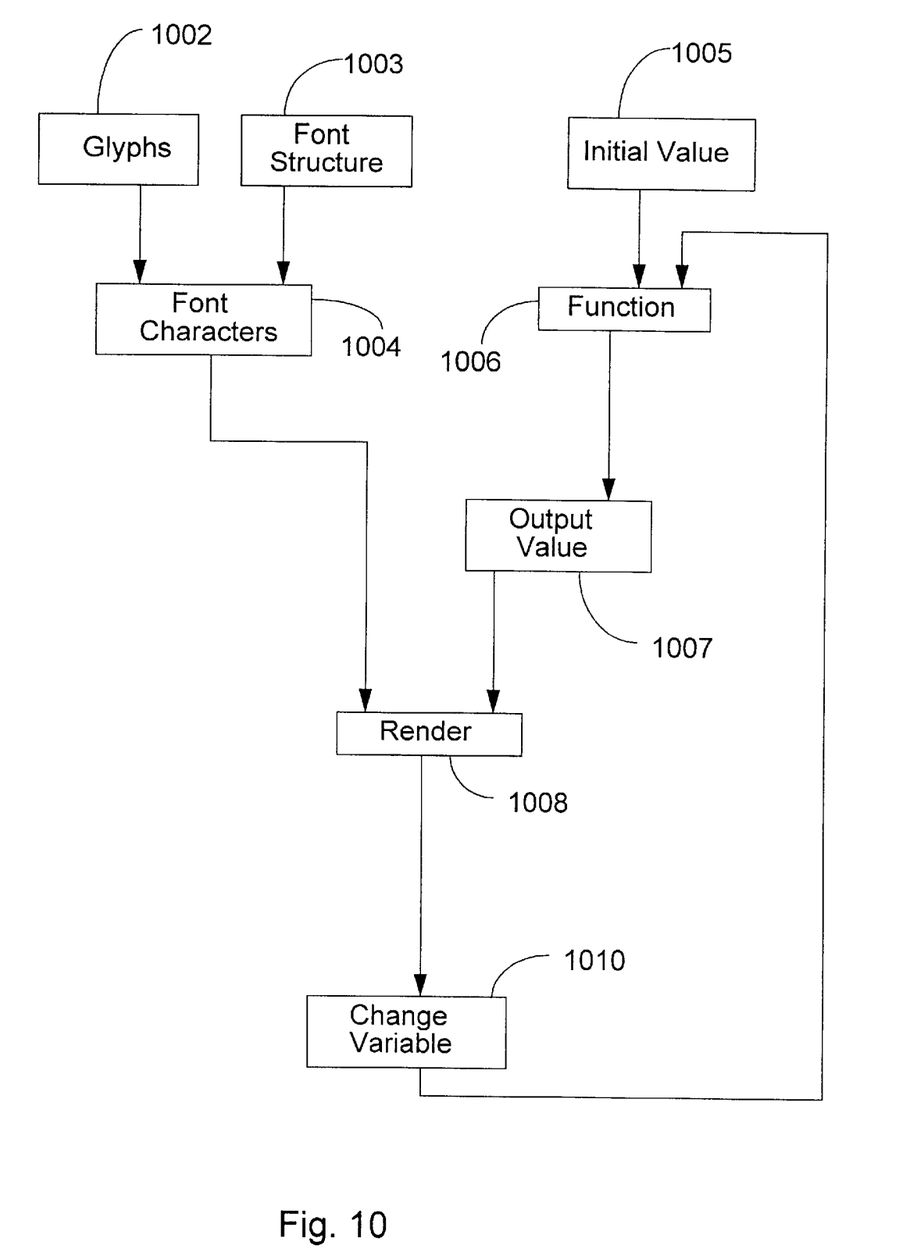
FIG. 10 shows a flow chart setting out the steps involved in implementing a preferred embodiment of the invention.

Turning to FIG. 10, there is shown a flowchart 1000 setting out the steps involved in implementing a preferred embodiment of the invention. Initially, in step 1001, a shape element is provided, the shape element being defined by a closed curve as described earlier. Next, Cw, Cb, Oh and Ol are defined (step 1002) in accordance with the description above. A diffuse highlight element is then generated in step 1003 on the basis of Cw and Oh defined in step 1002. A diffuse shadow element is then generated in step 1004 on the basis of Cb and Ol, as described previously in detail. Next, a specular element is generated (step 1005), as described above, and finally, the planar shape element, the diffuse elements and the specular element are rendered in step 1006.

It will be appreciated that the precise order of the steps is in many respects not critical. For example, the order in which the various elements are generated and their respective components are defined is in many cases not particularly important. It will also be understood that the particular combination of highlight, shadow and specular components can be customised to suit a particular application. For example, a diffuse highlight can be used by itself, in conjunction with a diffuse, or all three can be used simultaneously.

Figure 12:
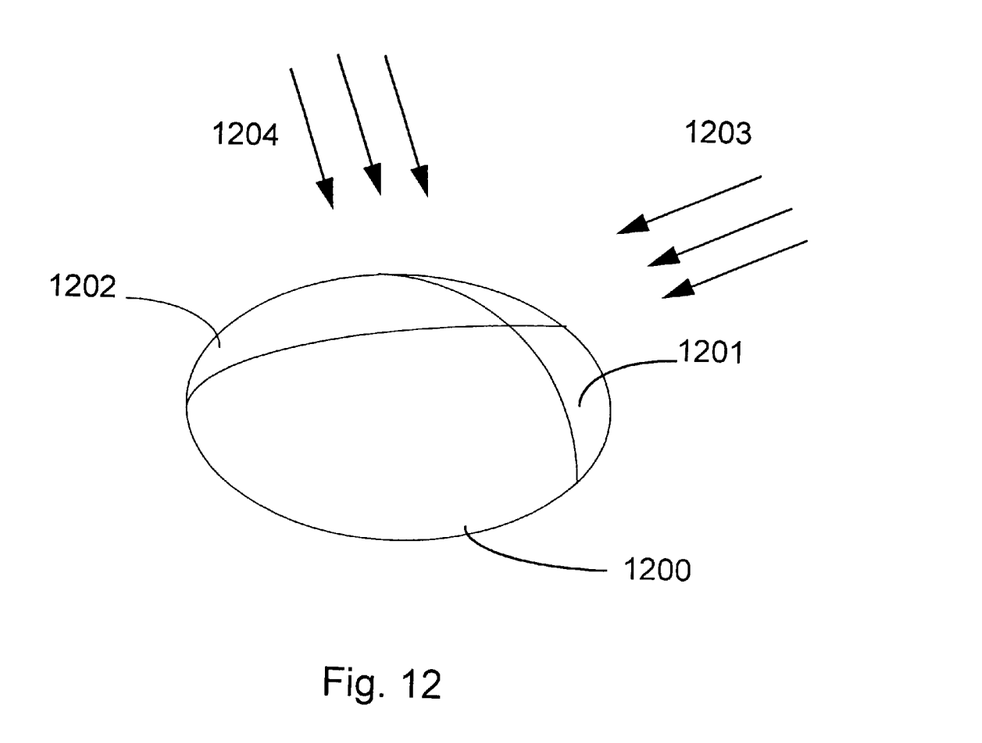
FIG. 12 shows a shape element illuminated by a plurality of light sources.

It will also be understood by those skilled in the art that in other preferred embodiments, different combinations of one or more of each of the highlight elements, shadow elements and specular elements can be applied to the shape element 1 to simulate illumination of a three-dimensional object by a plurality of light sources. An example is shown in FIG. 12, in which a shape element 1200 is provided with a first highlight element 1201 and a second highlight element 1202. The two highlight elements 1201 and 1202 are generated in accordance with the description above and composited onto the shape element 1200 to simulate illumination from first and second directions 1203 and 1204 respectively.

It will be appreciated that the different highlight and specular elements can be based on different colours, to simulate simultaneous illumination of a three-dimensional object from two (or more) light sources of different colour. Those skilled in the art will select a compositing scheme which deals adequately with any overlapping areas of highlight, shadow or glint. Alternatively, any software designed to implement this embodiment on, say, a personal computer can limit the light angles available to a user to prevent undesirable overlap of highlight and shadow regions.

Preferred embodiments of the invention will usually be implemented as a computer application hosted on, for example, the Windows operating system developed by Microsoft Corporation. However, it will be appreciated that the various embodiments can also be implemented on other computer platforms hosted by other operating systems, such as systems running UniX™, OS/2™, or DOS™. Preferably, the application program has a user interface that includes menu items and controls that respond to mouse and keyboard operations. Typically, the application program has the ability to transmit data to one or more printers either directly connected to the host computer or accessed via a telecommunications network The application program also has the ability to transmit and receive data to and from a connected digital communications network (for example, the internet).

Figure 11:
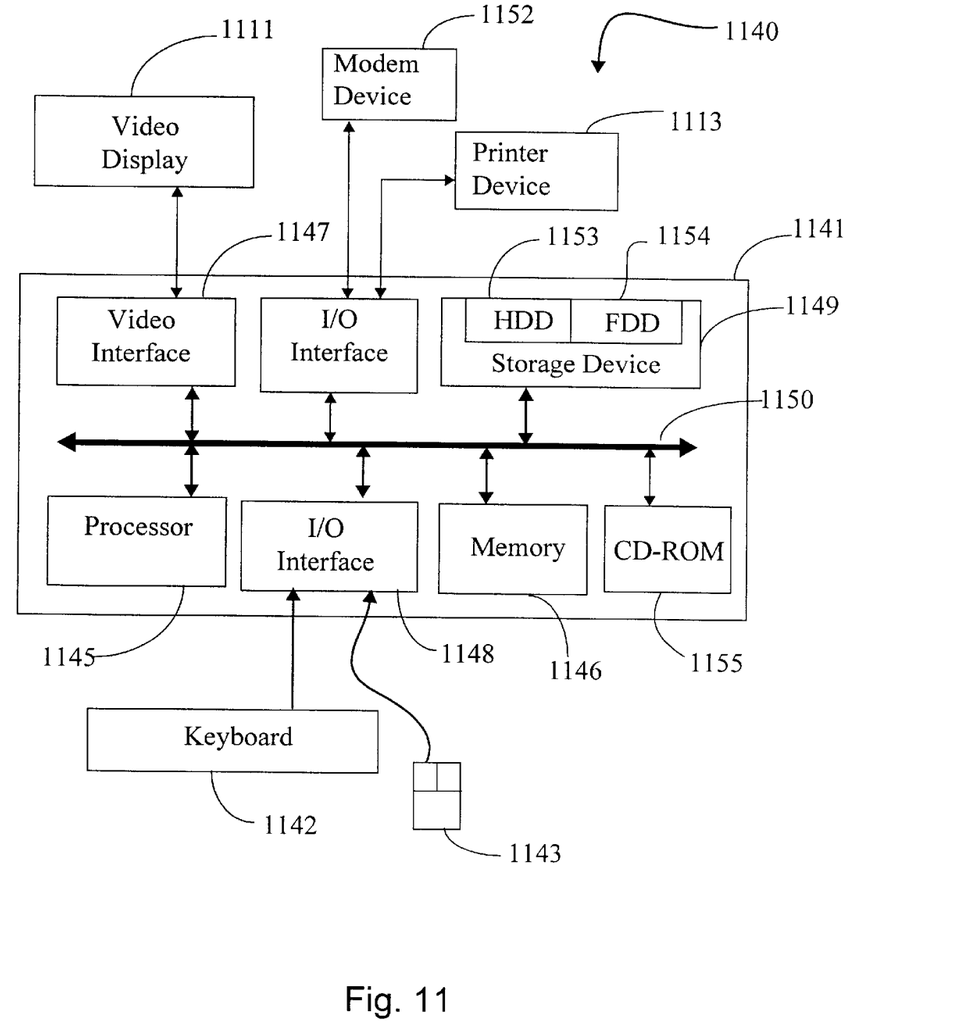
FIG. 11 is a schematic view of a general purpose computer for use in implementing a preferred form of the invention.

The preferred embodiments of the invention can be practiced using a conventional general-purpose computer system, such as the computer system 1140 shown in FIG. 11. The application program is implemented as software executed on the computer system 1140, the actual programming of the application program being a matter for the application of common general knowledge within the art.

The computer system 1140 comprises a computer module 1141, input devices such as a keyboard 1142 and mouse 1143, and output devices including a printer 1113 and a display device 1111. A modulator-demodulator ("modem") transceiver device 1152 is used by the computer module 1141 for communicating to and from a communications network, for example connectable via a telephone or other functional medium. The modem 1152 can be used to obtain access to the internet and other network systems.

The computer module 1141 typically includes at least one processor unit 1145, a memory unit 1146 formed from semiconductor random access memory (RAM) and read only memory (ROM), input/output (I/O) interfaces including a video interface 1147 and an I/O interface 1148 for the keyboard 1142 and mouse 1143. A storage device 1149 is provided and typically includes a hard disk drive 1153 and a floppy disk drive 1154. A CD-ROM drive 1155 is provided as a non-volatile source of data. The components 1145 to 1149 and 1153 to 1155 of the computer module 1141 communicate via an interconnecting bus 1150 resulting in the computer operating in a conventional mode known to those skilled in the art.

Examples of computers in which the embodiments can be practiced include IBM-PCs and compatibles, some sparcstations and the like. Typically, the application program of the preferred embodiment is resident on the hard disk drive 1153 and read and controlled using the processor 1145. Intermediate storage of the program, print list and any data fetched from the network can be accomplished using the semiconductor memory 1146, where necessary in concert with the hard disk drive 1153. In some instances, the application program is supplied to the user on a CD-ROM or floppy disk, whilst in others, it is obtained from the network via the modem device 1152.

Although the invention has been described with reference to a number of specific examples, it will be appreciated by those skilled in the art that the invention may be embodied in many other forms.

What is claimed is:

1. A method for simulating three-dimensional illumination of a planar shape element defined by a closed curve, the method including the steps of:

(a) providing a planar shape element having a colour Co;

(b) defining a colour Cw between Co and white;

(c) defining a colour Cb between Co and black;

(d) defining an opacity Oh;

(e) defining an opacity Ol;

(f) generating a diffuse highlight element based on a first curve portion of the closed curve, the colour and opacity of the diffuse highlight element graduating from Cw,Oh at a first edge portion thereof to Co, 0 at a generally opposite second edge portion thereof;

(g) generating a diffuse shadow element based on a second curve portion of the closed curve generally opposite the first curve portion thereof, the colour and opacity of the diffuse shadow element graduating from Cb,Ol at a first edge portion thereof to Co,0 at a generally opposite second edge portion thereof; and (h) rendering the planar shape element, the diffuse highlight element and the diffuse shadow element for printing or display, such that the diffuse elements are layered on top of the planar shape element, thereby to simulate three-dimensional illumination thereof;

wherein steps (a) to (h) may be performed in any suitable order.

2. A method according to claim 1, wherein the first edge portions of the diffuse highlight and shadow elements overlie the first and second curve portions of the closed curve upon which they are respectively based.

3. A method according to claim 2, wherein the respective second edge portions of the diffuse highlight and shadow elements are based on the first and second curve portions of the closed curve respectively.

4. A method according to claim 1, wherein the diffuse highlight and shadow elements are generated on the basis of preselected lighting parameters.

5. A method according to claim 4, wherein the lighting parameters include a light direction and a light elevation.

6. A method according to claim 5, the method further including the steps of;

defining a plurality of outward normals at a corresponding plurality of points on the closed curve;

calculating an angle between the light direction and each of the plurality of outward normals;

designating a section of the closed curve for which the calculated cosines are within a predetermined range and for which the normals are generally opposed to the light direction as the first curve portion; and designating a section of the closed curve for which the calculated cosines are within a predetermined range and for which the normals are generally aligned with the light direction as the second curve portion;

wherein the steps may be performed in any suitable order.

7. A method according to claim 4, wherein a width of the diffuse highlight and shadow elements is based on the preselected light elevation.

8. A method according to claim 1, further including the steps of:

generating a specular element; and during the rendering step, rendering the specular element such that it substantially overlaps the diffuse highlight element.

9. A method according to claim 8, wherein the specular element is defined by a peripheral curve.

10. A method according to claim 9, further including the step of defining the peripheral curve by geometric calculation based on the closed curve.

11. A method according to claim 9 or claim 10, including the step of generating the peripheral curve based on one or more snippets of the closed curve.

12. A method according to 11, wherein the snippets are linked by curved joining pieces.

13. A method according to claim 8, wherein the specular element has a central portion with colour Cw.

14. A method according to claim 13, wherein the specular element has a central portion having colour and opacity parameters Cw,s, where s defines the intensity of the central portion.

15. A method according to claim 14, wherein the colour and opacity of the specular element graduates from Cw at the central portion to Cw, 0 at the peripheral curve.

16. A method for simulating three-dimensional illumination of a planar shape element defined by a closed curve, the method including the steps of:
(a) providing a planar shape element having a colour Co;
(b) defining a colour Cw which is lighter than Co;
(c) defining a colour Cb which is darker than Co;
(d) defining an opacity Oh;
(e) defining an opacity Ol;
(f) generating a diffuse highlight element based on a first curve portion of the closed curve, the colour and opacity of the diffuse highlight element graduating from Cw,Oh at a first edge portion thereof to Co, 0 at a generally opposite second edge portion thereof;
(g) generating a diffuse shadow element based on a second curve portion of the closed curve generally opposite the first curve thereof, the colour and opacity of the diffuse shadow element graduating from Cb,Ol at a first edge portion thereof to Co,0 at a generally opposite second edge portion thereof; and
(h) rendering the planar shape element, the diffuse highlight element and the diffuse shadow element for printing or display, such that the diffuse elements are layered on top of the planar shaped element, thereby to simulate three-dimensional illumination thereof;
wherein steps (a) to (h) may be performed in any suitable order.

17. A method for simulating three-dimensional illumination of a planar shape element defined by a closed curve, the method including the steps of:
(a) providing a planar shape element having a colour Co;
(b) defining a colour Cw between Co and white;
(c) defining an opacity Oh;
(d) generating a diffuse highlight element based on a first curve portion of the closed curve, the colour and opacity of the diffuse highlight element graduating from Cw,Oh at a first edge portion thereof to Co, 0 at a generally opposite second edge portion thereof;
(e) rendering the planar shape element and the diffuse highlight element for printing or display, such that the diffuse highlight element is layered on top of the planar shape element, thereby to simulate three-dimensional illumination thereof;
wherein steps (a) to (e) may be performed in any suitable order.

18. A method for simulating three-dimensional illumination of a planar shape element defined by a closed curve, the method including the steps of:
(a) providing a planar shape element having a colour Co;
(b) defining a colour Cb between Co and black;
(c) defining an opacity Ol;
(d) generating a diffuse shadow element based on a first curve portion of the closed curve, the colour and opacity of the diffuse shadow element graduating from Cb,Ol at a first edge portion thereof to Co,0 at a generally opposite second edge portion thereof; and
(e) rendering the planar shape element and the diffuse shadow element for printing or display, such that the diffuse element is layered on top of the planar shape element, thereby to simulate three-dimensional illumination thereof;
wherein steps (a) to (e) may be performed in any suitable order.

19. A method for simulating three-dimensional illumination of a planar shape element defined by a closed curve, the method including the steps of:
(a) providing a planar shape element having a colour Co;
(b) defining a colour Cw which is lighter than Co;
(c) defining an opacity Oh;
(d) generating a diffuse highlight element based on a first curve portion of the closed curve, the colour and opacity of the diffuse highlight element graduating from Cw,Oh at a first edge portion thereof to Co, 0 at a generally opposite second edge portion thereof; and
(e) rendering the planar shape element and the diffuse highlight element for printing or display, such that the diffuse element is layered on top of the planar shape element, thereby to simulate three-dimensional illumination thereof;
wherein steps (a) to (e) may be performed in any suitable order.

20. A method for simulating three-dimensional illumination of a planar shape element defined by a closed curve, the method including the steps of:
(a) providing a planar shape element having a colour Co;
(b) defining a colour Cb which is darker than Co;
(c) defining an opacity Ol;
(d) generating a diffuse shadow element based on a first curve portion of the closed curve, the colour and opacity of the diffuse shadow element graduating from Cb,Ol at a first edge portion thereof to Co,0 at a generally opposite second edge portion thereof; and
(e) rendering the planar shape element and the diffuse shadow element for printing or display, such that the diffuse element is layered on top of the planar shape element, thereby to simulate three-dimensional illumination thereof;
wherein steps (a) to (e) may be performed in any suitable order.

21. A method according to claim 1, further including the step of generating one or more additional highlight elements, shadow elements or specular elements on the basis of different portions of the closed curve, and rendering them onto the shape element.

22. A method according to claim 21, wherein the additional highlight elements, shadow elements and specular elements are of a different colour to the original highlight element, shadow elements and specular elements.

23. Apparatus for providing simulated three-dimensional illumination of a planar shape element defined by a closed curve, the apparatus including:
(a) means for defining:
(aa) a colour Co of the planar shape element;
(ab) a colour Cw between Co and white;
(ac) a colour Cb between Co and black; and
(ad) an opacity Oh and an opacity Ol;

(b) diffuse element generation means for generating a diffuse highlight element and a diffuse shadow element, wherein:
  (ba) the diffuse highlight element is based on a first curve portion of the closed curve, the colour and opacity of the diffuse highlight element graduating from Cw,Ol at a first edge portion thereof to Co,0 at a generally opposite second portion thereof; and
  (bb) the diffuse shadow element is based on a second curve portion of the closed curve generally opposite the first curve portion thereof, the colour and opacity of the diffuse shadow element graduating from Cb,Ol at a first edge portion thereof to Co,0 at a generally opposite second portion thereof;
(c) rendering means for rendering the planar shape element, the diffuse highlight element and the diffuse shadow element for printing, storage or display, such that the diffuse elements are layered on top of the planar shape element, thereby to simulate three-dimensional illumination thereof.

24. A computer storage medium bearing one or more computer software programs for execution on a computer, the computer software program or programs including compiled or uncompiled software instructions for implementing a method of simulating three-dimensional illumination of a planar shape element defined by a closed curve, including instructions for implementing the following steps:

(a) providing a planar shape element having a colour Co;
(b) defining a colour Cw between Co and white;
(c) defining a colour Cb between Co and black;
(d) defining an opacity Oh;
(e) defining an opacity Ol;
(f) generating a diffuse highlight element based on a first curve portion of the closed curve, the colour and opacity of the diffuse highlight element graduating from Cw,Oh at a first edge portion thereof to Co,0 at a generally opposite second edge portion thereof;
(g) generating a diffuse shadow element based on a second curve portion of the closed curve generally opposite the first curve portion thereof, the colour and opacity of the diffuse shadow element graduating from Cb,Ol at a first edge portion thereof to Co,0 at a generally opposite second edge portion thereof; and
(h) rendering the planar shape element, the diffuse highlight element and the diffuse shadow element for printing or display, such that the diffuse elements are layered on top of the planar shape element, thereby to simulate three-dimensional illumination thereof;
  wherein the instructions can be performed in any suitable order.

* * * * *

UNITED STATES PATENT AND TRADEMARK OFFICE
CERTIFICATE OF CORRECTION

PATENT NO.    : 6,320,581 B1
DATED         : November 20, 2001
INVENTOR(S)   : Cameron Bolitho Browne Page 1 of 1

It is certified that error appears in the above-identified patent and that said Letters Patent is hereby corrected as shown below:

Column 1,
Line 11, "it," should read -- it --.

Column 4,
Line 1, "shows" should read -- show --; and
Line 3, "shows" should read -- show --.

Column 6,
Line 19, "affects" should read -- affect --.

Column 7,
Line 17, "network" should read -- network. --.

Column 8,
Line 39, "of;" should read -- of: --.

Column 9,
Line 4, "11," should read -- claim 11, --.

Column 11,
Line 7, "Cw,Ol" should read -- Cw,Oh --; and
Line 14, "thereof;" should read -- thereof; and --.

Signed and Sealed this

Nineteenth Day of March, 2002

*Attest:*

*Attesting Officer*

JAMES E. ROGAN
*Director of the United States Patent and Trademark Office*